United States Patent [19]

Corbett

[11] 4,067,241

[45] Jan. 10, 1978

[54] IMPROVEMENTS IN OR RELATING TO OSCILLATING CRYSTAL TRANSDUCER SYSTEMS

[76] Inventor: James Patrick Corbett, 50 Rolling Hill Drive, Chatham Township, Morris County, N.J. 07928

[21] Appl. No.: 699,451

[22] Filed: July 1, 1976

Related U.S. Application Data

[63] Continuation-in-part of Ser. No. 499, 489, Oct. 22, 1974, Pat. No. 4,020,448

[51] Int. Cl.² .............................................. G01L 7/08
[52] U.S. Cl. ...................................... 73/717; 310/331
[58] Field of Search ...................... 73/398 R, DIG. 4; 340/10; 310/8.6, 8.8

[56] References Cited

U.S. PATENT DOCUMENTS

3,187,300  6/1965  Brate .................................. 73/398 R

FOREIGN PATENT DOCUMENTS

694,803  7/1940  Germany .............................. 73/398
861,325  2/1961  United Kingdom.

Primary Examiner—Jerry W. Myracle
Attorney, Agent, or Firm—Brumbaugh, Graves, Donohue & Raymond

[57] ABSTRACT

A fluid pressure transducer comprises a chamber; one or more matched, plate-like crystals within the chamber; electrical means for exciting each of the crystals and means for transmitting forces originating from fluid pressures on two diaphragms located on the chamber to the crystal or crystals so as to produce a change in the resonant frequency of the crystal or crystals. This change is a measure of the difference in fluid pressures applied to the two diaphragms.

13 Claims, 5 Drawing Figures

IMPROVEMENTS IN OR RELATING TO OSCILLATING CRYSTAL TRANSDUCER SYSTEMS

This application is a continuation-in-part of my co-pending application Ser. No. 499,489 filed Oct. 22, 1974, now U.S. Pat. No. 4,020,448 issued Apr. 26, 1977. The specification and drawings of that prior application are hereby incorporated into this application by reference.

This invention relates to oscillating crystal transducer systems and particularly to a fluid pressure transducer using one or more crystals mounted within a chamber to measure the magnitude of differential pressures.

According to the present invention there is provided a fluid pressure transducer comprising a chamber; one or more crystals mounted within the chamber; electrical means for exciting each of the crystals and two diaphragms arranged on the chamber to enable forces arising from fluid pressures on these diaphragms to be transmitted to the crystals to bring about a change of the resonant frequencies of the crystals.

In one embodiment of the invention a single crystal is mounted in the chamber which has a diaphragm at each of its opposing ends. The face of the crystal is situated at right-angles to the diaphragms and two diametrically opposite crystal edges sit in seatings attached to the centers of the diaphragms. Differential pressures on the two diaphragms cause a change in the frequency at which the crystal resonates.

Preferably the diaphragms are arranged to seal the chamber. The crystal is under a preset compressive force arising from initial deflection of the diaphragms during assembly of the device.

Alternatively, two crystals may be employed, the edge of one of each of the crystals being arranged to sit in the aforementioned seat associated with each diaphragm, the remaining diametrically opposite crystal edge in each case, being supported by an arm secured to the inside of the chamber. With this arrangement, both crystals change frequency when differential pressures are applied to the two diaphragms and the resultant difference-frequency, between the two crystals, is a measure of the differential pressures applied to the diaphragms.

Yet a further differential pressure gage is similar but has the added feature that each diaphragm has a second diaphragm or spring associated with it and arranged in such a way to be coupled to the center of said diaphragm mechanically. This arrangement facilitates the securing of the crystal seat so that no adverse rocking motion of the seat can occur as may be the case with the earlier arrangements.

In the case of each of the foregoing embodiments an oscillator circuit is arranged to maintain each crystal in oscillation at its natural frequency of resonance within the described securing. Electronic counting means are normally arranged to detect the change in ferquency when the values of the aforesaid differential pressures which it is required to measure, vary. To obtain higher resolution electronic multiplying means may be provided between the oscillator circuits and the counting means. Alternatively, high resolution may be achieved by employing the well-known period-count method.

Reference will hereinafter be made to the accompanying drawings which illustrate various embodiments of the invention by way of example.

Figure 1:
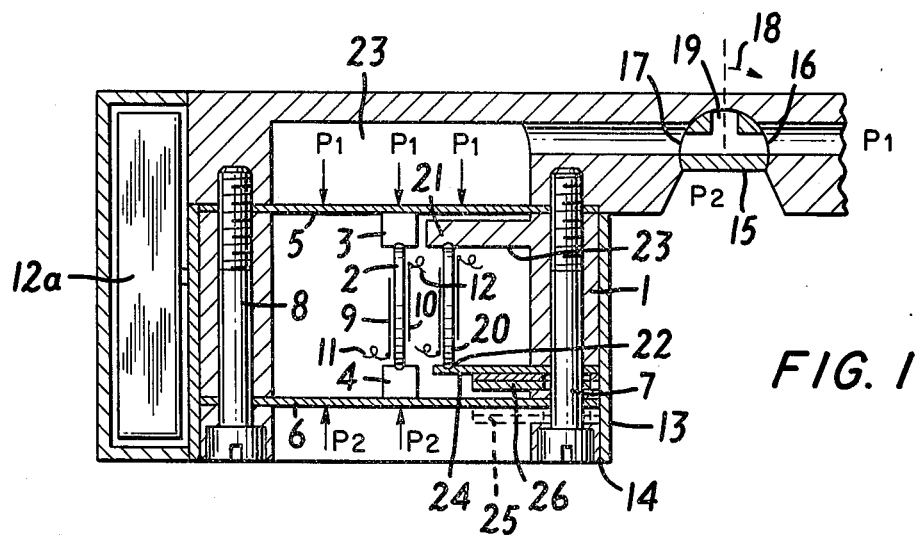
FIG. 1 shows a cross-sectional elevation view of the simplest form of the pressure transducer.

Referring to FIG. 1, a substantially cylindrical housing 1, as viewed in plan, contains a single plate-like crystal 2 mounted in two seatings 3 and 4. The crystal may, for example, be made of quartz, and may be circular in side elevation.

The seatings are secured at the centers of two circular diaphragms 5 and 6. These diaphragms are securely clamped to the cylindrical housing 1 by bolts 7 and 8. Diaphragms 5 and 6 are partly stressed to cause crystal 2 to be firmly gripped within housing 1. In some applications diaphragms 5 and 6, instead of being exactly flaty in their unstressed condition may be pre-formed to a particular shape to cause the instrument to have a particular differential-pressure versus crystal-frequency variation characteristic.

Electrodes 9 and 10 on opposing sides of crystal 1 are connected by fine wires 11 and 12 to an electrical maintaining oscillator circuit in cavity 12 a. This circuit keeps the crystal in oscillation at its natural resonant frequency in the securings described. Such a circuit may, for example, be of the Clapp Oscillator type. The crystal may also, in some applications, be in a fundamental mode of oscillation but in other applications a higher harmonic, i.e. overtone mode, may be desirable. The crystal is preferably arranged to oscillate in the megaherz range and it may be AT cut.

In operation pressure P1 is applied to diaphragm 5 and a different pressure P2 is applied to diaphragm 6. Thus the crystal experiences a compressive force which changes by an amount proportional to the difference between pressures P1 and P2.

In practice it may sometimes be convenient to hermetically seal housing 1 by placing over it ring 13, and for example, welding or otherwise sealing joint 14.

Further, it may also be desirable to arrange the transducer to receive pressure P1 and P2 on diaphragm 5 alternately, so that the differential pressure between them can be measured in a short span of time. This will have the advantage that undesired drifts due to time, temperature or other effects in the instrument will be eliminated. Such operation is achieved using valve 15. Port 16 of the rotating valve stem 17 allows pressure P1 to be applied to diaphragm 5. Rotation of valve stem 17, through a right-angle in the direction indicated by arrow 18, causes ports 16 and 19 to exhaust the incoming fluid pressure P1 to atmosphere which, in the case of the present example, is designated as pressure P2. At the same time, valve stem 17 permits cavity 23 to be exhausted to atmosphere so that pressure P1 now becomes equal to atmospheric pressure P2. Operation of valve stem 17 will be clarified by reference to FIG. 2 where the alternative position of valve stem 17 is shown for illustration. Alternating operation of valve stem 17 from its position shown, to the new position described, will alternately make pressures P1 and P2 equal and unequal, making measurement of the differential pressure possible with respect to the output indication of the instrument when P1 and P2 are equal. This has the advantage of establishing an accurate frequent recalibration of the instrument. Valve stem 17 could be rotated slowly by a small geared motor, a solenoid or by a shaft which forms part of other machinery. Also, it could be self-actuated, for example, turbine driven, from the source of pressure 1.

In normal use of the transducer, the resonant frequency of crystal 2 may be indicated by an electronic counter which itself has its period of counting-time set by a further crystal. To ensure crystal 2 and this counter crystal experience the same enviromental conditions, e.g., temperature changes, it may be desirable to locate this second crystal within chamber 1. in some applications of the transducer in cases where higher overall accuracy of the system is a pre-requisite.

Such a further crystal 20 is shown located in housing 1 of FIG. 1. It is secured between seatings 21 and 22 which are located on brackets 23 and 24 extending from housing 1.

Because it may be expensive to provide a pair of crystals 2 and 20 which are matched identically to one another, undesitable drift in the output reading of the device, due to environmental temperature changes, may be compensated by adding to support 24, a bimetal strip 26 so that changes in force arising from the bimetal, will cause desired compensating changes in the resonant difference-frequencies of the two crystals because crystal 20 is responsive to forces exerted by the bimetal in a manner similar to the force-responsive behaviour of crystal 2. The force-responsiveness of circular AT cut crystals which may, for example, be used in the present type of transducer, varies when the crystals are rotated, as described in my U.S. Pat: No. 3,891,870 and my U.S. Pat. No. 4,020,448. This feature may be used to preset the degree of output reading drift compensation arising from the use of the bimetal strip as described in the U.S. Patent and Application.

If crystal 2 is not located within housing 1 as heretofor described, then an alternative bimetal strip 25 supported from the housing 1 and impinging on diaphragm 6 may be employed to exert a force on diaphragm 6. Bimetal strip 25 is adjustable in length to exactly supply the force necessary to cause compensation for undesirable drift of readings due to environmental temperature changes.

Figure 2:
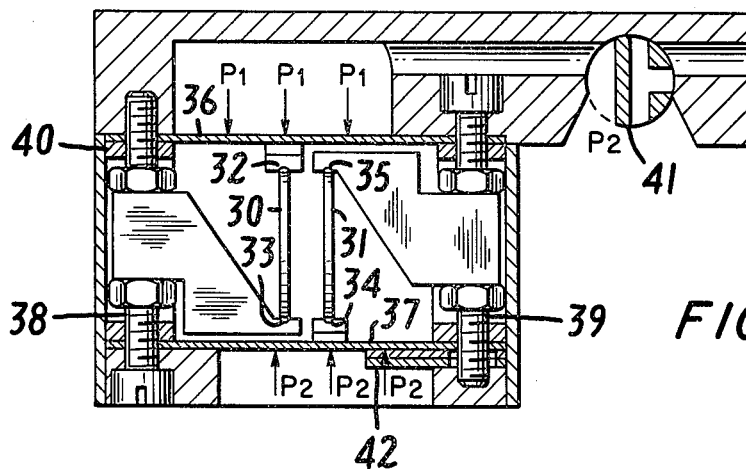
FIG. 2 shows a cross-sectional elevation view of a further embodiment employing two crystals.

FIG. 2 shows an improved alternative transducer to that of FIG. 1. In this case, two crystals 30 and 31 are secured respectively in seatings 32,33 and 34,35. Seatings 32 and 34 are secured to the centers of diaphragms 36 and 37 respectively. Seatings 33 and 35 take the form of rigid arms secured by bolts 38 and 39 which clamp the main components of housing 40, together.

In this arrangement, a pair of crystals 30 and 31, having matched temperature and other characteristics, have electrodes and connections similar to the crystal of FIG. 1. Each of the crystals 30 and 31 experiences a change of resonant frequency when differential pressures P1 and P2 are applied to diaphragms 36 and 37. Thus the difference in resonant frequencies is a measure of the differential in pressure between P1 and P2.

Valve 41 which is identical to valve 15 of FIG. 1. can again be employed as heretofor described to remove drift errors of the device.

Bimetal strip 42 is also analagous to bimetal strip 25 of FIG. 1 and compensates for drift in reading of the instrument due to change of environmental temperature in the manner already described.

Figure 3:
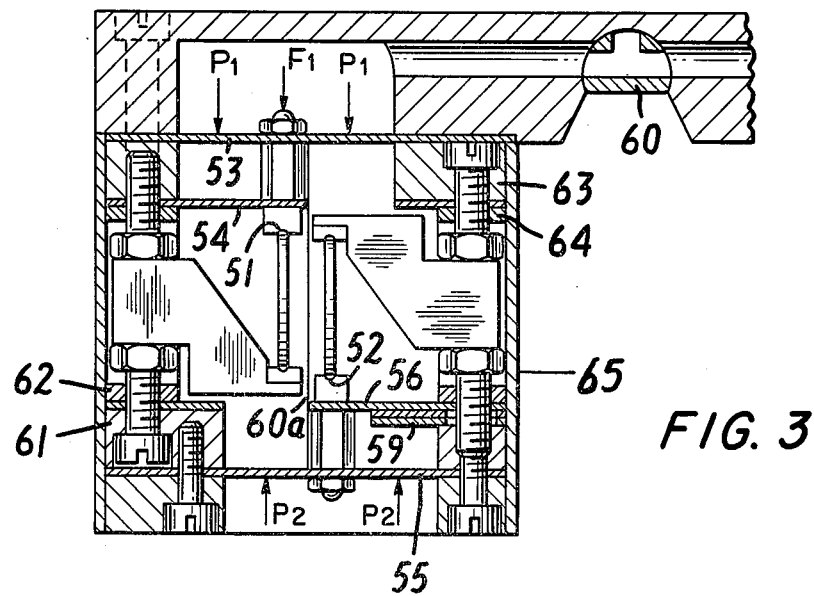
FIG. 3 shows a cross-sectional elevation view of an embodiment employing two crystals with additional restraining features for securing the crystal seatings.

FIG. 3 shows a further improved transducer from the unit described with reference to FIG. 2. Seatings 51 and 52 are supported, in this case, by diaphragms 53 and flat spring 54 also diaphragm 55 and flat spring 56 respectively. This double support of each seating 51 and 52 has the advantage of increased rigidity of securing so that seatings 51 and 52 do not rock due to slight uneven bending of the diaphragms with increasing pressures P1 and P2 as is the case with the transducer arrangement of FIG. 2.

Bimetal 59 and valve 60 compensation may also be employed as heretofor described with reference to the transducers of FIGS. 1 and 2.

Whereas flat diaphragms and springs have been shown in the figures appended to this specification it is to be understood that other types of diaphragms such as corrugated, or serrated types may alternatively be used, also that the flat springs already referred to, by way of example, may take the forms of spring tongues with holes in them and similar alternatives.

A further constructional feature of the transducer arrangement of FIG. 3 resides in the assembly of the unit in two halves which divide at line 60a. The two housing sections 61, 62 and 63, 64 can each be assembled initially without the diaphragms 53 and 55, the crystals being held firmly in each half unit by spring tongues 54 and 56. This has the advantage of ease of location and adjustment of each crystal within the half-units. Finally the two half-units are secured within protective cylinder 65, and diaphragms 53 and 55 bolted in place.

Figure 4:
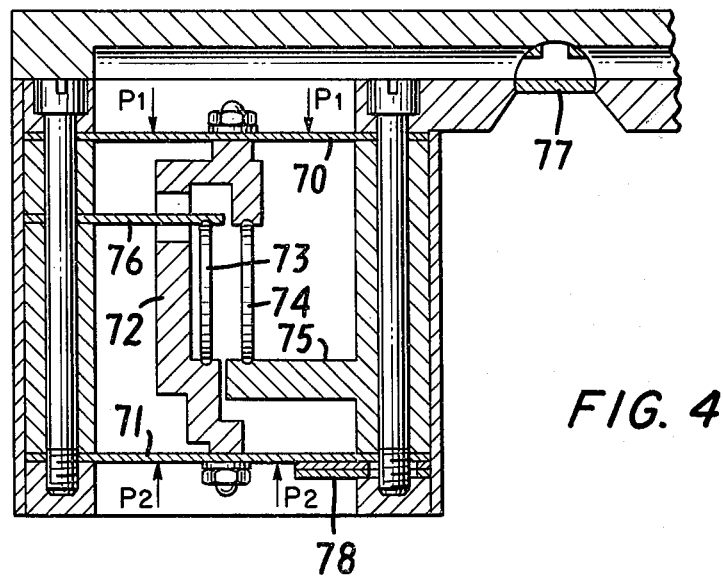
FIGS. 4 and 5 show cross-sectional elevations of embodiments in which a single spring applies a pre-load to the two crystals.

FIG. 4 shows an alternative transducer to those of FIGS. 1 and 2. Two diaphragms 70 and 71 support a main stem 72 on which are seated two crystals 73 and 74. The other edges of crystals 73 and 74 are seated on rigid arm 75 and on spring arm 76. This latter will be seen to exert a precompressive force on the two crystals provided diaphragms 70 and 71 are ostensibly unstressed. Thus, as fluid pressures P1 and P2 become unequal, the resonant frequencies of crystals 73 and 74 will become unequal and the degree of such inequality will be an accurate measure of the differential pressure.

Figure 5:
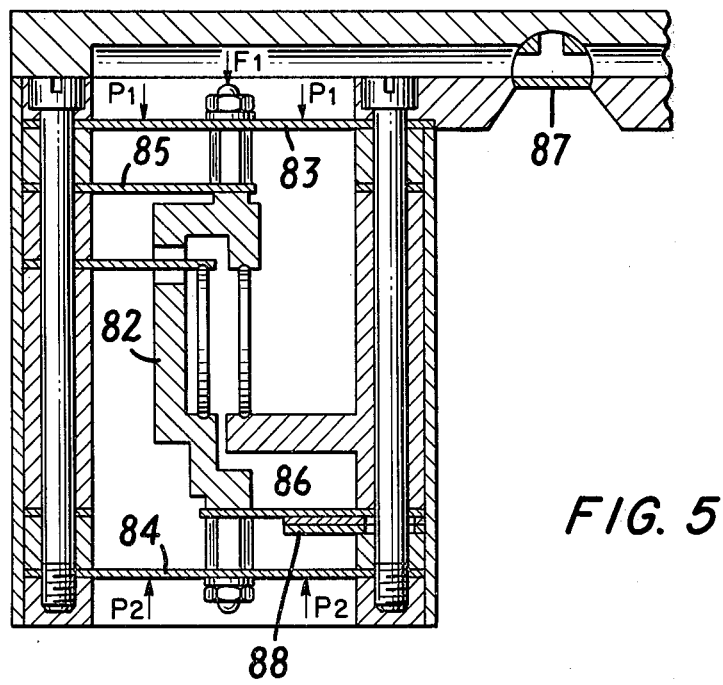

FIG. 5 shows a transducer having further improvements over the arrangement of FIG. 4. In this case additional rigidity of main stem 82 is provided by the double-securing method detailed with respect to FIG. 3. Diaphragms 83 and 84 with springs 85 and 86 respectively secure each end of stem 82. The additional rigidity ensures higher accuracy of the device.

As with all of the devices described in this application, the transducer described above, may be used as a differential force gage as well as a differential pressure gage. Yet further, it is valuable as a force gage which may be fully sealed and either evacuated or filled with an inert gas for long-term protection of the crystals. When used in this way, force F1, which is to be measured, would be applied, for example, at the points shown in the arrangements of FIGS. 3 and 5. Pressures P1 and P2 would then be equal and at atmospheric pressure. In this way, changes in atmospheric pressure would be compensated and accurate measurement of Force F1 would be achieved whereas no such compensation is present in certain earlier force-measuring units having a single diaphragm.

As with the transducer arrangements of FIGS. 1, 2 and 3, the valves 77 and 87 shown in FIGS. 4 and 5 may again be used to provide recalibration of the devices, also bimetal strips 78 and 88 may be arranged to compensate for thermal drift which may be present in the instrument reading.

In all of the foregoing transducer arrangements the chamber containing the crystals and their supports may be sealed and either evacuated or filled with an inert gas to ensure long operating life of the crystals without drifts in their resonant frequencies due to changes of humidity, noxious gases or undesired particles which may otherwise enter the chamber.

NOTE: The primary differences between the present patent application and any of my previous patents and applications is in the presence of two diaphragms with a single crystal secured between them, alternatively in two diaphragms secured to the edges of two crystals, the opposing edges of each crystal being secured to the transducer housing or to a spring secured in turn to the housing.

Previous patents and applications relied either on two diaphragms clamping a single crystal to a part of the housing, or on a single diaphragm and one crystal or two crystals where one edge of each crystal is secured to the housing.

I claim:

1. A fluid pressure transducer comprising;
   a chamber;
   two matched plate-like piezo-crystals disposed within the chamber;
   electrical means for exciting each of the crystals;
   two diaphragms situated on the chamber;
   means for transmitting forces originating from fluid pressures on the diaphragms to the edges of at least one of the crystals.

2. A fluid pressure transducer as claimed in claim 1 in which either crystal sustains a force originating from a bimetal strip.

3. A fluid pressure transducer comprising
   a chamber;
   two matched plate-like piezo-crystals disposed within the chamber;
   electrical means for exciting each of the crystals;
   two diaphragms situated on the chamber;
   means for transmitting forces originating from fluid pressures on the diaphragms to one edge of each of the respective crystals the alternative edge in each case being supported by a member attached to the transducer housing.

4. A fluid pressure transducer as claimed in claim 3 in which the crystals are clamped in position by springs which apply forces at one crystal edge in each case, the opposing edge being supported by a projection from the transducer housing.

5. A fluid pressure transducer as claimed in claim 4 in which one of the crystal seatings sustains a force originating from a bimetal strip.

6. The fluid pressure transducer comprising;
   a chamber;
   two matched plate-like piezo-electric crystals disposed within the chamber;
   electrical means for exciting each of the crystals; two diaphragms situated on the chamber;
   a member engaging one edge of each crystal and joining the two diaphragms;
   a pre-load spring engaging the other edge of one of the crystals;
   the other edge of the second crystal being secured to the housing;

7. A fluid pressure transducer are claimed in claim 6 in which a bimetal strip is arranged to apply a force to one of the two diaphragms, the force being adjustable.

8. A fluid pressure transducer as claimed in claim 1 in which a valve is arranged to alternatively apply one of the pressures to be measured to one of the diaphragms at one time and apply the pressure experienced by the second diaphragm to the first diaphragm at other times.

9. A fluid pressure transducer as claimed in claim 1 in which the chamber may be a fully sealed unit filled with inert gas.

10. A fluid pressure transducer as claimed in claim 1 in which the chamber may be a fully sealed unit which is evacuated.

11. A fluid pressure transducer as claimed in claim 1 arranged to measure the difference between two fluid pressures by causing the resonant frequencies of oscillation of two oscillating crystals, contained therein, to change.

12. A fluid pressure transducer as claimed in claim 1 in which a force may additionally be measured by applying it to the center points of one of the two diaphragms.

13. A transducer as claimed in claim 1 in which the transducer is made in two sections each containing one crystal, the sections being secured together to form the final assembly.

* * * * *